(12) United States Patent
Chevallier et al.

(10) Patent No.: US 9,418,701 B2
(45) Date of Patent: Aug. 16, 2016

(54) METHOD FOR DETERMINING IDENTIFIERS OF SEGMENTS FORMING AN AUDIOVISUAL DOCUMENT AND RECEIVER IMPLEMENTING THE METHOD

(71) Applicant: Thomson Licensing, Issy de Moulineaux (FR)

(72) Inventors: Louis Chevallier, Cesson-Sevigne (FR); Jean-Ronan Vigouroux, Cesson-Sevigne (FR); Hassane Guermoud, Cesson-Sevigne (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 942 days.

(21) Appl. No.: 13/651,554

(22) Filed: Oct. 15, 2012

(65) Prior Publication Data

US 2013/0097372 A1   Apr. 18, 2013

(51) Int. Cl.
*G06F 12/00* (2006.01)
*G11B 27/00* (2006.01)
*G06F 17/30* (2006.01)
*G06F 17/27* (2006.01)

(52) U.S. Cl.
CPC ............... *G11B 27/00* (2013.01); *G06F 17/27* (2013.01); *G06F 17/30* (2013.01)

(58) Field of Classification Search
CPC .......... G06F 17/27; G06F 17/30; G11B 27/00
See application file for complete search history.

(56) References Cited

U.S. PATENT DOCUMENTS

| 7,188,270 B1* | 3/2007 | Nanda ................. G06F 11/1076 711/114 |
| 2001/0024472 A1 | 9/2001 | Sporer et al. |
| 2004/0133927 A1 | 7/2004 | Sternberg et al. |
| 2011/0219003 A1* | 9/2011 | Bi ........................... G06F 17/30 707/739 |

FOREIGN PATENT DOCUMENTS

JP     60131690     7/1985

OTHER PUBLICATIONS

Search report dated Apr. 19, 2012.

* cited by examiner

*Primary Examiner* — Kalpit Parikh
(74) *Attorney, Agent, or Firm* — Brian J. Dorini; Patricia A. Verlangieri (57) ABSTRACT

The invention relates to a method for determining identifiers associated with segments of a document. Each segment consists of a series of individual elements such as images or sound sequences. Each segment of the document is subdivided into a determined number of portions comprising the same number of individual elements. An individual element is extracted from the most central portion of each segment and associated with the segment as identifier.
The invention also relates to the receiver capable of implementing the method.

14 Claims, 5 Drawing Sheets

METHOD FOR DETERMINING IDENTIFIERS OF SEGMENTS FORMING AN AUDIOVISUAL DOCUMENT AND RECEIVER IMPLEMENTING THE METHOD

This application claims the benefit, under 35 U.S.C. §119 of EP Patent Application 11306327.5, filed 13 Oct. 2011.

The invention relates to a method for creating identifiers in a document, and a receiver implementing the method.

These days, there are many appliances that can be used to receive, store in memories such as hard disks and play back recorded audiovisual documents. These appliances can store documents downloaded either from a one-way broadcast network, or from a point-to-point network (Internet for example). Among these appliances, the PVRs (personal video recorders) are generally provided with an Electronic Programme Guide (EPG) which enables the user to display identifiers of documents recorded in memory, to select them and play back the associated documents by entering a command. This quantity of available information requires the addition of new functionalities in the PVRs allowing for fast navigation within the recorded document. The appliance has a user interface that makes it possible to control the selection and the playback of the recorded documents.

The audiovisual documents stored in DVDs are generally segmented into a number of chapters referenced via an identifier. The producer of the document performs a subdivision into a plurality of segments having a semantic unit, each segment occupying a time band. The audiovisual document is associated with a table containing the start and end indices of each segment. In a simple embodiment, each segment is identified by a chronological number. However, this number provides little information to the user. To enable the user to better identify the segment, the segment is associated with an identifier which can be textual, visual, audio or audiovisual. Thus, the segment can be identified by a title, or by an image characteristic of that segment, or even by an image associated with a sound clip extracted from that segment. The identifiers are created by the producer of the document who is best able to give an identity to the segments. The identifiers and the indices pointing to each segment are placed in a table associated with the audiovisual document. The user interface extracts the data from the table to present the identifiers enabling the user to select the segments with better accuracy.

The problem arises when the document is not segmented. In this case, there are segmentation methods that can be executed on the receiver. The patent application referenced FR02.13977 filed in France on 28 Oct. 2002 describes a segmentation method which analyses the audiovisual document of the work to extract portions therefrom that have a semantic unit. The method described in that application makes it possible to generate a segmentation of sport videos according to several levels. There are also methods that make it possible to automatically extract the tree structure of a film or of a documentary video. Conventionally, the video is subdivided into shots based on abrupt changes of the colorimetric content of the images. Then, the shots are combined into scenes based on the visual resemblance of the contents of the shots and their proximity in time. In a particularly simple manner, the segmentation methods assign an image of said segment as identifier of that segment, this image is, for example, extracted from the middle of the segment.

These methods for segmenting and identifying segments which analyse in real time the audiovisual documents received, require significant resources and, in particular, a significant memory size for the storage of the images currently being processed. These resources may be proportional in size to the length of the segments, a length which cannot be determined in advance. There is therefore a real need for a method for determining identifiers within an audiovisual document that uses a minimum of memory resources.

Thus, the present method proposes a method for determining a plurality of identifiers associated with segments of a document.

More specifically, the invention relates to a method for determining a plurality of identifiers associated with segments of a document, each segment consisting of a series of individual elements such as images or sound sequences; characterized in that it comprises the following steps:

sequential processing of the individual elements of each segment and storage of individual elements in a determined number of memories, this determined number being independent of the number of individual elements of the segments of the document, subdivision of each segment into a number of portions comprising the same number of individual elements, the number of portions being equal to the number of memories plus one unit, determination of an individual element in each segment, this individual element being extracted from the memory associated with the most central portion of the segment, association of each duly determined identifier with the associated segment.

In this way, the duly determined identifiers are more representative of the associated segment. Since the determined number of memories is independent of the number of individual elements of the segments of the document, it can be very small and thus reduce the cost of the equipment.

According to a first refinement, the method comprises a step of storage of individual elements in a shift register made up of memories, each memory being designed to contain an individual element, the storage consisting in shifting the content of the memories from the first to the last memory, the first memory receiving the individual element currently being processed. The content of the last memory of the register contains the identifier of the segment at the time of the detection of the last individual element of that segment. The number of portions is equal to the number of memories of the register plus one unit. The storage step takes place when the index of the individual element in the last memory is less than or equal to the result of the integer division of the index of the individual element currently being processed by the number of portions, multiplied by the result of the integer division of the number of portions by 2. In this way, by using only one shift register with a few memories, it is possible to determine identifiers of the segments of the document.

According to another refinement, the number of memories of the shift register is even. In this way, the number of portions of the document is odd and there is only a single portion in the middle of the segments. According to another refinement, each individual element is associated with an interest value, the storage step does not take place when the interest value of the individual element currently being processed is less than the interest value of the individual element stored in the last memory of the shift register. In this way, if the identifier that has to be stored offers a lesser interest than that which is already stored, the shift is not performed and the identifier remains the same. According to a refinement of the last refinement, if a storage step does not take place because of the interest value of the individual element currently being processed, then the storage step corresponding to the next occurrence is performed regardless of the interest value of the individual element currently being processed at the time of that next occurrence. In this way, the memories are assigned only once consecutively, and the identifying frame stored in the last memory is relatively close to a central portion of the segment.

According to a refinement, the document is an audiovisual document, the individual elements being frames of said document. According to a refinement, a sound sequence associated with the identifying frame is also stored in each of the memories, the identifier is made up of the frame and the stored sound sequence. In this way, the identification of the segments is enhanced.

According to another refinement, a plurality of identifiers are played back, and the selection of an identifier triggers the playback of the segment associated with that identifier. In this way, the identifiers make it possible to select and play back the segments of the document.

Another subject of the invention is an audiovisual receiver comprising a central processing unit, a storage means, and a means for subdividing said document into a plurality of segments, each segment consisting of a series of individual elements, such as images or sound sequences; characterized in that the subdividing means sequentially processes the individual elements of each segment to subdivide each segment into a determined number of portions comprising the same number of individual elements, said storage means allows for the storage of individual elements in a determined number of memories, this determined number being independent of the number of individual elements of the segments of the document, the receiver also comprising a means for determining an individual element in each segment, this individual element being extracted from the most central portion of the segment and associated with the segment as identifier.

Other features and advantages of the invention will now become apparent with more detail in the context of the following description of exemplary embodiments given by way of illustration, with reference to the appended figures which represent.

The present invention can be implemented by any appliance capable of processing documents and of segmenting them. These documents may be sound, or visual or audiovisual. The description that follows constitutes only an exemplary embodiment.

Figure 1:
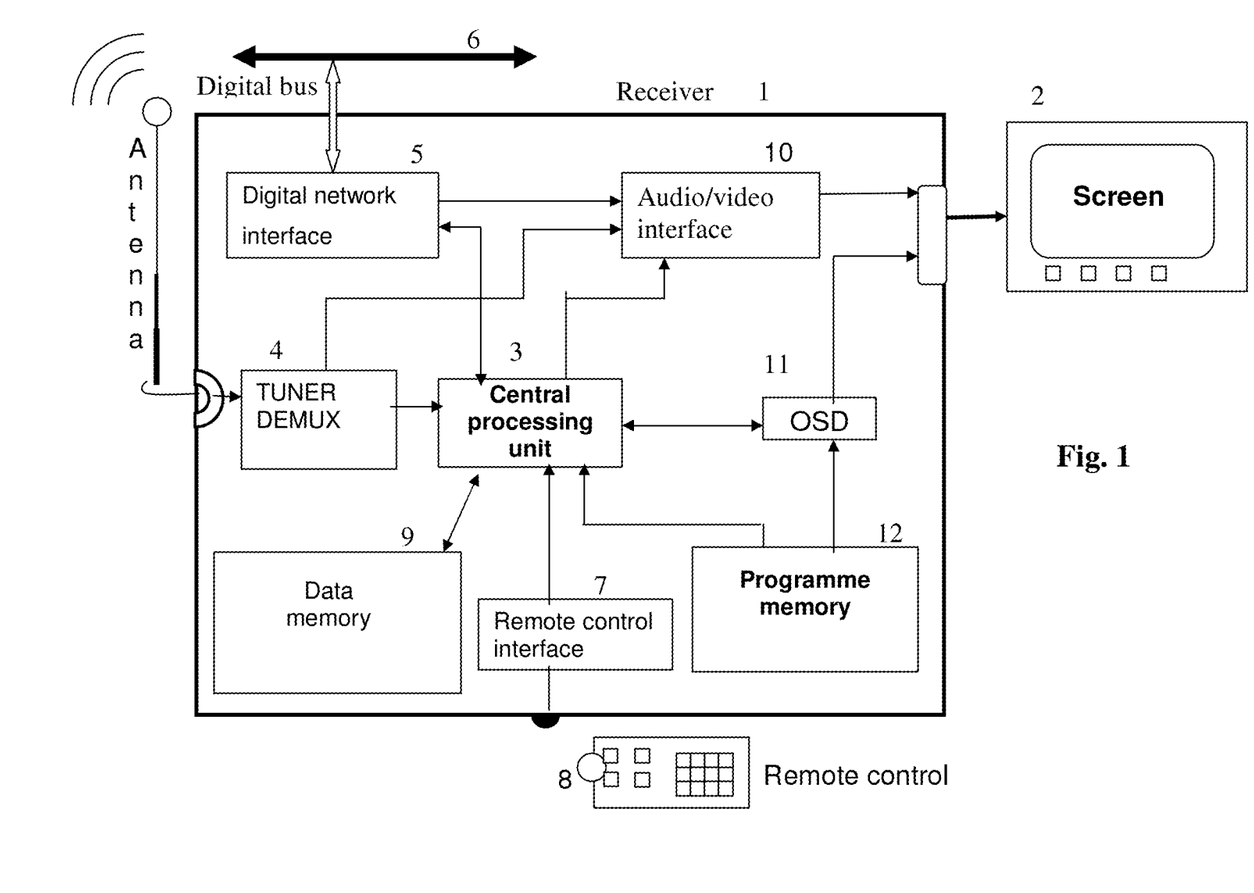
FIG. 1 is a block diagram of an audiovisual receiver for the implementation of the invention.

FIG. 1 describes an audiovisual receiver 1 provided with a display device 2 capable of implementing the invention according to an exemplary embodiment. The receiver comprises a central processing unit 3 linked to a programme memory 12, and an interface 5 for communication with a local highspeed digital bus 6 enabling audio/video data to be transmitted in real time, the Internet for example. The memory 12 may be of ROM, Eprom or flash type, or a hard disk, or a combination of these elements. The receiver can also receive audio/video data from a broadcast network through a receiving antenna associated with a demodulator 4. The receiver also comprises a receiver of infrared signals 7 for receiving the signals from a remote control 8. The central processing unit 3 is linked to a memory 9 for the storage of data. This memory, represented in the form of a single unit in FIG. 1, may consist of a number of components comprising at least one RAM memory and may also comprise a FLASH or EEPROM memory, a hard disk or any other mass storage unit incorporated in or connected to the receiver 1. The RAM memory comprises at least one shift register comprising at least two frame memories, and two tables T1 and TA for the storage of the identifying frames detected and of the addresses of the segments.

The receiver 1 comprises an audio/video decoding logic 10 for the generation of the audiovisual signals sent to the television screen 2. The remote control 8 is provided with direction keys: ↑, ↓, → and ← and function or validation keys such as: "Select" and "OK". The direction arrows make it possible to move a focus on the screen, the commands accessible to the user are presented in the form of icons and are activated when the user presses "OK" with the focus positioned on the icon corresponding to the desired command. As a variant, the receiver is connected to a mouse which moves a cursor on the screen also making it possible to select icons. According to another variant, the cursor is moved by voice recognition, the user entering the commands using a microphone linked to the receiver 1.

The receiver 1 also comprises a circuit 11 for displaying data on the screen, often called OSD (on-screen display) circuit. The OSD circuit 11 is a text and graphics generator which makes it possible for the screen to display menus, pictograms (for example, a number corresponding to the channel being viewed) and which allows navigation menus to be displayed in accordance with the present invention. The OSD circuit is controlled by the central processing unit 3 and an application stored in the memory 12, for example a navigation application. The application is advantageously produced in the form of a program module stored in a read-only memory. It may also be produced in the form of a custom circuit of ASCI type for example. The digital bus 6 and/or the broadcast network transmit to the receiver 1 data comprising audiovisual documents.

Figure 2:
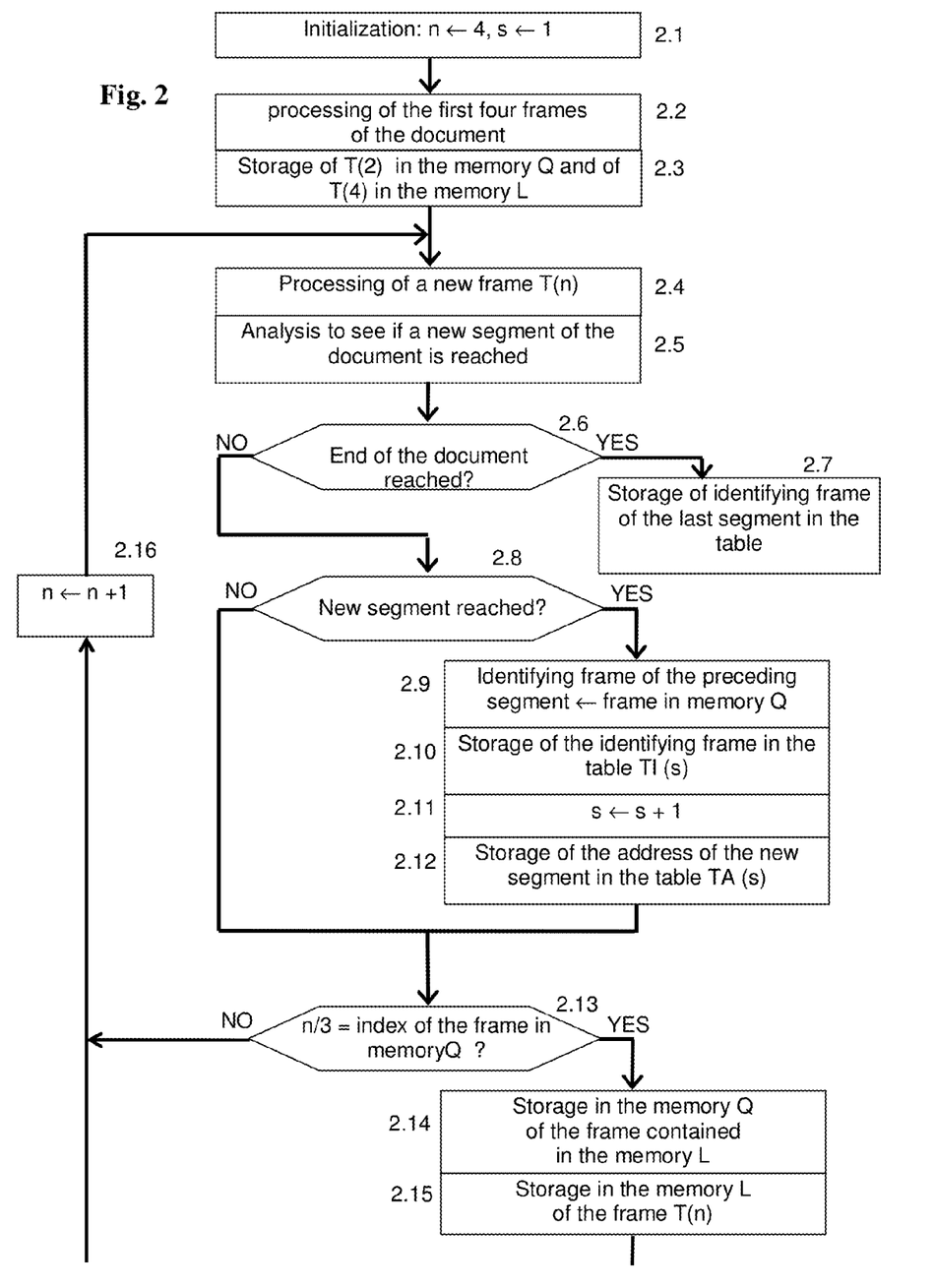
FIG. 2 is a flow diagram of the main steps performed by the extraction method according to a preferred exemplary embodiment.

After having described the elements of the invention according to a preferred exemplary embodiment, we will now explain how these cooperate, with the help of FIG. 2.

FIG. 2 presents a flow diagram of the main steps performed by the method for determining segment identifiers according to an exemplary embodiment. The method illustrated by this example provides for the use of a shift register with two frame memories L and Q. It can easily be adapted to examples using a greater number of frame memories, as will be seen hereinbelow.

In a first step, the user selects a document and orders its download. The audiovisual documents are preferentially recorded in the memory 9, preferentially on an internal or external hard disk. Advantageously, but in a nonlimiting manner, the method described by FIG. 2 is executed in parallel with the reception of the document by the receiver 1, each frame received being immediately processed before the arrival of the next frame.

In the step 2.1, the method initialize the frame counters n to the value 4 and the segment counter s to the value 1. The first four frames of the document are processed by the receiver 1 (step 2.2). In the step 2.3, the frame T(2) is stored in the last memory Q the shift register and the frame T(4) is stored in the first memory L of the shift register. The frame T(n) designates the digital data representing the nth image of the document, said data being able to be compressed or not. The processing loop for each frame begins at the step 2.4, for example upon the reception of the frame by the receiver 1. In the step 2.5, the received frame is analysed in order to determine whether it is the first frame of a new segment. The detection of new segments within an audiovisual document is performed according to techniques that are known per se. For example, the received document has marks defining the different segments of the document. These descriptive data allow for a fine subdivision of the document and comprise text making it possible to give at least a title to each segment. The descriptive data are, for example, contained in the service information specified by the DVB-SI standard.

In the step 2.6, the method tests whether the end of the document has been reached. In this case, the method is stopped and the identifying frame of the last segment of the document is stored in the table TI, this identifying frame being the frame stored in the memory Q (step 2.7). The value s which is the number of segments of the document and the two tables T1 and TA are associated with the document recorded in memory 9. This information will be used in the applications described below.

If the end of the document is not detected, the method tests to see whether the frame received is the first frame of a new segment (2.8). In this case, the identifying frame of the segment which has just ended is the frame stored in the memory Q (step 2.9). In the step 2.10, this frame is stored in the table of the identifying frames indexed by the value of the counter s. Then, the counter s is incremented in order to process a new segment (step 2.11). Finally, the address or the time reference of the segment which is beginning is stored in the table of the indices TI (step 2.12). The method for determining the identifying frames continues with the step 2.13 by testing whether the integer portion of the value of the counter n divided by 3 is equal to the number of the frame contained in the memory Q. If this is not the case, the method loops back to the step 2.16 by updating the index of the frame currently being processed, in order to have a new frame acquired. Otherwise, the frame stored in the memory L is stored in the memory Q (step 2.14) and the last frame received T(n) is stored in the memory L (step 2.15). Then, the method loops back to the step 2.16 by incrementing the index n of the frame currently being processed, then to the step 2.4 in order to have a new frame acquired.

On completion of the step 2.7, the document which has just been segmented and provided with identifying frames is associated with two tables: one containing the frames used to identify the "s" segments and the other containing the addresses or time references used to point to each segment in the recorded document.

The flow diagram of FIG. 2 represents an exemplary embodiment of the invention. Any method capable of subdividing each segment of a document into a determined number of portions comprising the same number of frames and of selecting a frame in the most central portion of each segment, is suitable in the context of the present invention.

Figure 3:
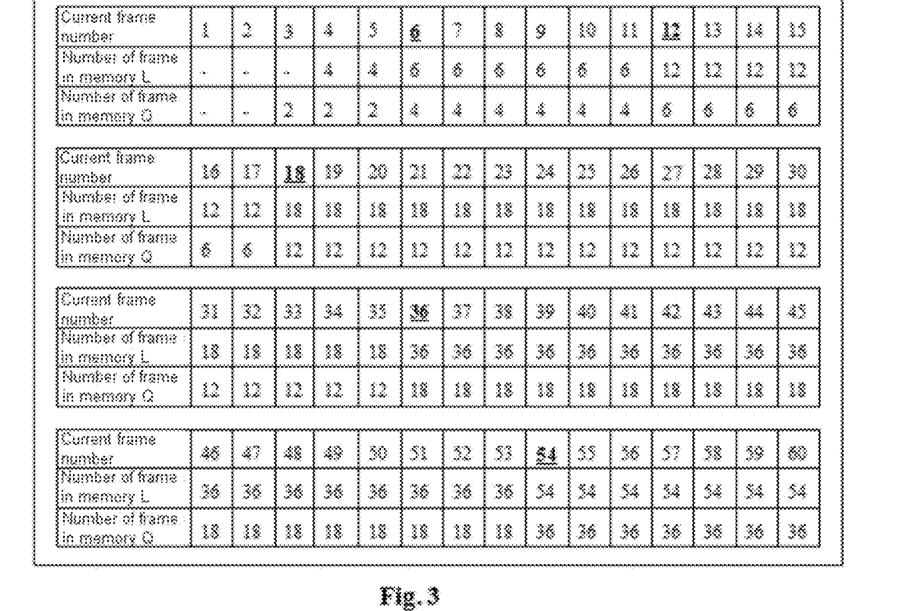
FIG. 3 is a table showing the first values of indices of identifying frames calculated according to an exemplary embodiment of the invention.

FIG. 3 presents a table of the frame numbers stored in the memory Q and the memory L according to the number of the frame currently being received of a segment, according to one exemplary embodiment. The numbers of the frames for which a shift of the memories Q and L occurs are underscored: 6, 12, 18, 36, 54, etc. These values are those for which the integer portion of the value of the counter n divided by 3 is equal to the number of the frame contained in the memory Q. Thus, when the sixth frame is received, the frame number 2 which is in the memory Q is replaced by the frame number 3 which is in the memory L, and the memory L receives the current frame, that is to say the frame number 6. When the ninth frame is received, the frame number 3 which is in the memory Q is replaced by the frame number 6 which is in the memory L, and the memory L receives the current frame, that is to say the frame number 9, and so on. As can be seen, a certain number of shifts of the frame memories L and Q are performed for each segment, so the longer the segment, the greater the number of shifts. The frame number n for which the shift of index i is performed can be determined by using the following formula:

If i is odd: the shift of index i takes place at the frame number PES ($3^{(i/2)}$), in which PES is the higher integer portion function (for example, the higher integer portion of 3.2 is 4), if i is even: the shift of index i takes place at the frame number $[(n(i+1)+n(i+1))]/2$.

This formula is applicable only for a method that uses only two frame memories; it can perfectly well be generalized to a greater number of memories.

Figure 4:
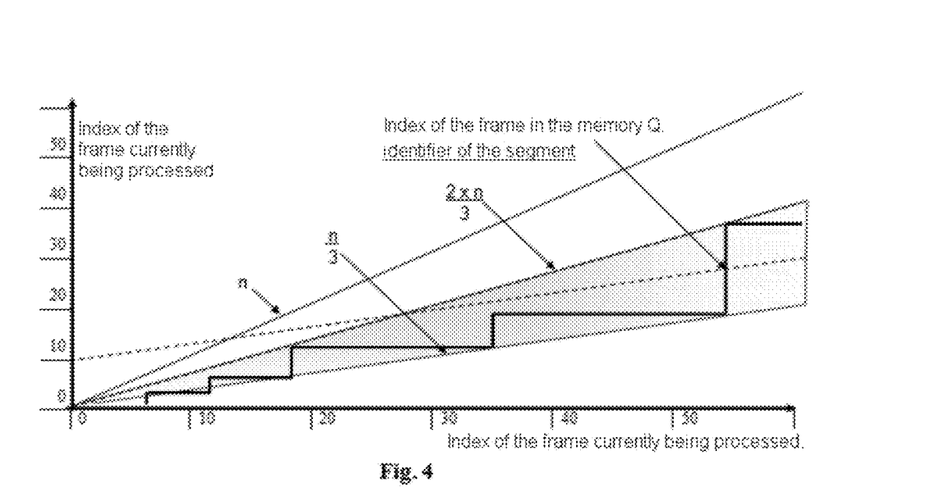
FIG. 4 is an illustration of the subdivision of a recorded document and of the moment of the shifting of the content of the memories in the register.

FIG. 4 represents a graph showing the trend of the index of the frame stored in the memory Q as a function of the number n of the current frame. The value n increases regularly as and when the images of a segment are received. For certain identifiable values in the table of FIG. 3, the frames in the memories L and Q are shifted. The graph of FIG. 4 shows that the index of the frame in the memory Q is always situated between the value n/3 and (2×n)/3, where n is the index of the current frame. Thus, the identifying images extracted at the end of a segment are situated in the second third of this segment.

It is possible to reduce the distance between the frame representative of the segment and the middle of said segment by increasing the number of frame memories. More generally, let us assume that there are k frame memories $M_k$, $M_{k-1}$, ... $M_2$, $M_1$ in the shift register, where:

$M_k$ is the last memory of the register containing the identifying image when the end of the segment is detected, $M_k$ receives the frame from $M_{k-1}$ upon shift, $M_1$ is the first memory, it receives the frame Tn currently being read within the segment at the time of an assignment.

When the end of the segment is reached, the image stored in the memory $M_k$ and which becomes the identifying frame of the segment is located in a portion situated towards the centre of the segment. If the number k is even, the number k+1 of segment portions is then odd and the identifying frame of the segment is located in the segment in the middle, it is the portion numbered (k/2)+1. If the number k is odd, the number k+1 of portions is then even and the identifying frame of the segment is located in one of the portions alongside the middle of the segment: the portion (PES[k/2]+1), or the portion (PES [k/2]+2). Because of this, it is preferable to choose a shift register that has an even number of memories.

The test applied in the step 2.13 is then modified in that, if the index of the frame in the last frame memory is less than or equal to the result of the integer division of the index of the frame currently being read by the number of portions, multiplied by the result of the integer division of the number of portions by 2, then the frame memories are reassigned. For example, for 4 memories and a partitioning of the segment into 5 portions, the test in the step 2.13 triggering a new assignment is: is the value of [PES[t/(k+1)]×PES[(k+1)/2] less than the index of the frame in the last frame memory?

The initialization of the algorithm, illustrated by the steps 2.2 and 2.3, is performed using an arithmetical series during the first $k^2$ frames. The first frame memory is initialized with the image k, the second with the image 2×k, the third with the image 3×k, and so on to the image k×k. From the image $k^2$, the frames are processed by the steps 2.4 to 2.16. In this way, the quantity of memory used to store the frames is independent of the length of the segments of the document. The extracted identifier is situated in proximity to the middle of the segment of the document, for example in the median third or median fifth. The method can be used by exploring the document in a single pass.

The method for determining identifying frames which has just been described by a particular embodiment can be used by various applications that can be executed by the central processing unit 3 of the receiver 1 and stored in memory 12. One application consists, for example, in displaying the identifying frames and in launching the playback of a segment by selecting the associated identifying frame. Such a navigation application displays the exemplary screen appearance illustrated by FIG. 5. At the time of the launch of the navigation application, a document has been previously received and segmented, the identifying frames of each segment have been determined and stored in a table according to the method described previously. The user launches the navigation application within said document. The navigation application generates the signals for displaying the menu 5.1 which is displayed on the viewing screen 2.

A cursor 5.2 can be used to select the various menu items. The user moves the cursor 5.2 using a pointing means such as direction keys of the remote control 8 or a mouse connected to the receiver 1. The menu 5.1 displays four identifying frames 5.3 which are images extracted from four consecutive segments. Advantageously, information 5.4 appears below the image identifying the segment, such as: the number of the segment within the document, the segment start time and the segment end time relative to the start of the document. The user selects the identifying frame of a segment by positioning the cursor 5.2 on the image. To indicate the selection, the menu emphasises the selected image by framing it in a particular way (see FIG. 5), or by blinking, or by highlighting. Then, by pressing the "OK" key, the user launches the playback of the selected segment. The navigation application searches in the table T1 for the index of the segment associated with the selected identifying frame and launches the playback from that moment. The image of the segment appear in full screen display mode. When the segment is played back, a submenu (not represented in FIG. 5) remains visible on the screen. This submenu contains at least the following four functions: stop on image, jump to next segment, jump to preceding segment, return to main menu. By pressing another key, the user makes the menu 5.1 or the submenu disappear and the navigation application is then closed.

Another application likely to use to the identifying frames relates to the classifying of the documents. By analysing the dominant colours, the presence of objects or the detection of a particular face, it is then possible to classify the document in categories by processing only the identifying frames and not all the images of the document. In this way, the classifying processing time is shorter.

According to a refinement, the test performed in the step 2.13 of FIG. 2 which triggers the shift takes an interest value of the image currently being read into account. The means that makes it possible to subdivide the document into segments analyses the images received in real time and can give an interest value by using, for example, the salience maps. Each frame is therefore associated with an interest value. According to this refinement, when the step 2.13 has decided to perform a shift of the content of the frame memories, a test consisting in comparing the interest values of the image currently being read and of the imaging in the last frame memory is performed. If the interest value of the image currently being read is greater than that of the image in the last frame memory, then the shift is performed. If the interest value of the image currently being read is less than or equal to that of the image in the last frame memory, and if, in the preceding step 2.13, the content of the frame memories has not been shifted because of the interest value, a shift is performed. Checking whether, in the preceding test, a shift has indeed been performed in the light of the interest value, makes it possible to shift the contents of the memories only once consecutively, so that the identifying frame stored in the memory Q is not located too far away from the central portion of the segment. If the interest value of the image currently being read is less than or equal to that of the image in the last frame memory, and if, in the preceding step 2.13, the frame memories have been shifted, the content of the memories is not shifted.

Figure 6:
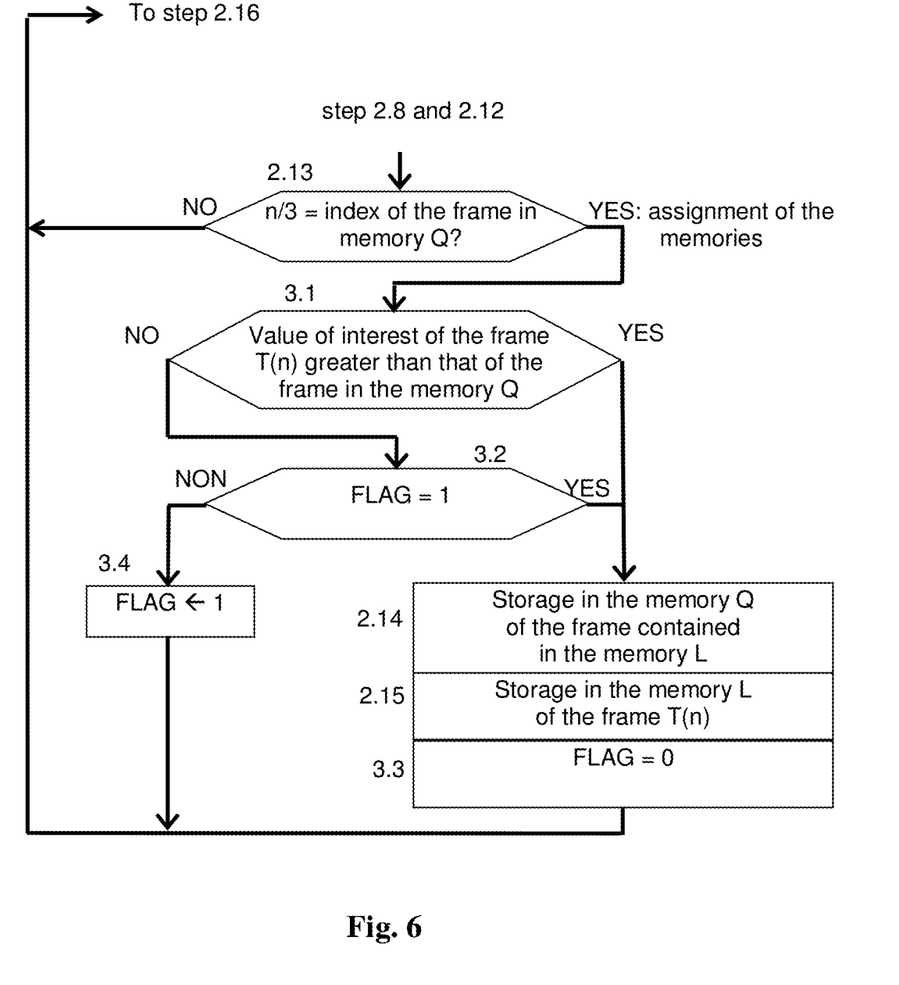
FIG. 6 is a flow diagram illustrating a refinement of the present invention aiming to take account of an interest value of the images.

FIG. 6 illustrates this refinement. The flow diagram of FIG. 2 is modified so as to show a flag "FLAG". This flag has the value "1" if, in the last execution of the step 2.13, the interest value of the image currently being read was evaluated as less than or equal to that of the image in the last frame memory, and therefore, the shifting of the content of the frame memories did not take place.

The step 2.13 tests whether the index of the current frame results in a shift of the content of the memories. If such is the case, the interest value of the image currently being read T(n) is compared to that of the image in the frame memory Q (step 3.1). If the interest value of the image currently being read T(n) is greater, then the shifts defined by the steps 2.14 and 2.15 are performed. Otherwise, in the step 3.2, the value of the flag FLAG is tested. If the value is 1, which means that, in the preceding step 2.13 there was no shift because of the interest value of the image T(n) being less than or equal to that of the image in the memory Q; in this case, the shift is performed. In the preceding two cases, the flag FLAG is set to the value 0 (step 3.3). If, in the test of the step 3.2, the value of the flag FLAG is 0, then it is possible to dispense with the shifting of the content of the frame memories and the flag is then set to 1 (step 3.4). Then, the programme loops back to the step 2.16 to update the index n and process a new frame.

According to another refinement, when the images are stored in the frame memories (in the steps 2.14 and 2.15), a sound sequence is then associated with the stored image and stored in the table TT. The creation of the sound sequence is performed by constantly storing the sound content of the audiovisual document during reception in a memory for which the pointer is managed circularly. This memory is preferentially situated in RAM and allows for the storage of approximately 30 seconds of sound content. When, in the steps 2.14 and 2.15, the frame memories are updated, then the content of the memory managed circularly is placed in a portion associated with the frame memories. When the end of the segment is detected, the frame in the memory W and the associated sound sequence are stored in the table TT. Thus, when an application using identifying frames of segments, has a visual content and a sound content available.

According to a variant, the creation of the sound sequence is performed by taking into account the sound breaks, such as the silences. For this, the pointer addressing the memory which records the sound content of the audiovisual document currently being received is systematically repositioned at the start of the memory each time a sound break is detected. As long as the sound sequence continues, the sound continues to be recorded. If a shift of the content of the frame memories is performed (steps 2.14 and 2.15), then the storage of the associated sound sequence takes place when the sound break is detected. In this way, the sound content is that which corresponds to the moment of the image identifying the segment.

This variant avoids having sentences truncated. Advantageously, the recording of the sound sequence can be prolonged after the reception of the associated image, but this recording ends in any case when the end of the segment is detected.

The exemplary embodiment which has just been presented relates to the determination of identifying frames within a visual or audiovisual document. The method also applies for a sound document. In this case, the individual elements are uninterrupted sound sequences, phrases within a song for example. The segment is determined by an analysis of the sound content, for example the same musical background. The segmentation method may make use of filtering techniques making it possible to eliminate the musical component of a sound in order to keep only the vocal component. Such a method is applicable for processing concert recordings for example. Since each segment is a song, the identifier may be a phrase sung in the middle of the song. This method can also be applied to the analysis of news transmitted by the radio, the segments being the reports and the individual elements being the sentences spoken by the reporter. Once recorded and segmented, the user can navigate using the identifiers and select the report that he or she is interested in.

Figure 5:
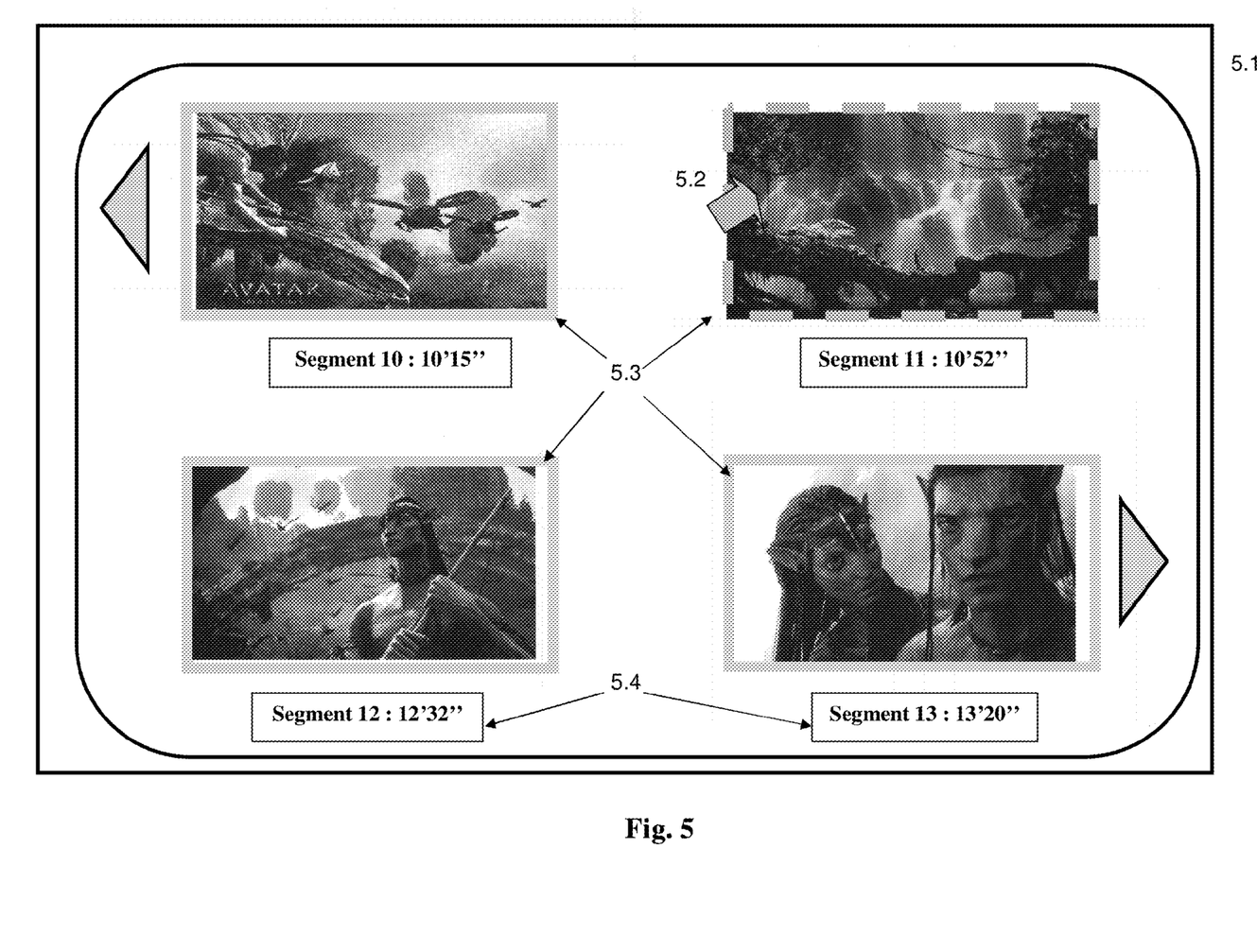
FIG. 5 is a representation of a screen showing a navigation menu using identifiers extracted according to the method.

As has been described previously, descriptive data can be associated with the document. These data can also be associated with the individual element selected as identifier of the segment. In this case, these data are placed in the table TI by associating them with the frames used as identifier. These data are used by the various applications. For example, the navigation application reproduces descriptive data in the navigation menu, for example by displaying them close to the graphic elements referenced 5.4.

Although the present invention has been described with reference to the particular embodiments illustrated, it is in no way limited by these embodiments, but is limited only by the appended claims. It will be noted that changes or modifications will be able to be made by those skilled in the art.

The invention claimed is:

1. A method for determining an identifier for a segment of a document, the method comprising:
    sequentially processing the individual elements of the segment in a plurality of memories comprising a shift register, a first memory and a last memory;
    subdividing the segment into a number of portions equal to a number of individual elements in the segment plus one;
    storing the individual elements in the plurality of memories by shifting the elements from the first memory to the last memory, when an index of the individual element in the last memory is less than or equal to a first result multiplied by a second result, the first result being equal to an index of an individual element currently being processed divided by the number of portions, the second result being equal to the number of portions divided by two;
    extracting from the plurality of memories an individual element from the segment that is most centrally positioned between a first individual element and a last individual element of the segment; and
    assigning the most centrally positioned individual element of the segment as the identifier of the segment.

2. The method according to claim 1, wherein a number of memories of the shift register is even.

3. The method according to claim 2, wherein storing the individual elements further comprises storing a currently processed individual element, when an interest value associated with the currently processed individual element is greater than or equal to an interest value associated with the last individual element stored in the last memory of the shift register.

4. The method according to claim 3, wherein storing the individual elements further comprises storing a next individual element regardless of the interest value of the currently processed individual element.

5. The method according to claim 1, wherein the document is an audiovisual document, the individual elements being frames of said document.

6. The method according to claim 5, further comprising storing a sound sequence associated with the most centrally positioned individual element in each of the plurality of memories such that the identifier of the segment further comprises the sound sequence.

7. The method according to claim 1, further comprising playing back the identifier associated with the segment.

8. An audiovisual receiver for determining an identifier for a segment of a document, the audiovisual receiver comprising:
    a plurality of memories comprising a shift register, a first memory and a last memory;
    at least one processor configured to:
    sequentially process individual elements of the segment in the plurality of memories;
    subdivide the segment into a number of portions equal to a number of individual elements in the segment plus one;
    store the individual elements in the plurality of memories by shifting the elements from the first memory to the last memory, when an index of the individual element in the last memory is less than or equal to a first result multiplied by a second result, the first result being equal to an index of an individual element currently being processed divided by the number of portions, the second result being equal to the number of portions divided by two;
    extract from the plurality of memories an individual element from the segment that is most centrally positioned between a first individual element and a last individual element of the segment; and
    assign the most centrally positioned individual element of the segment as the identifier of the segment.

9. The audiovisual receiver according to claim 8, wherein a number of memories of the shift register is even.

10. The audiovisual receiver according to claim 9, wherein to store the individual elements the at least one processor is further configured to store a currently processed individual element, when an interest value associated with the currently processed individual element is greater than or equal to an interest value associated with the last individual element stored in the last memory of the shift register.

11. The audiovisual receiver according to claim 10, wherein to store the individual elements the at least one processor is further configured to store a next individual element regardless of the interest value of the currently processed individual element.

12. The audiovisual receiver according to claim 8, wherein the document is an audiovisual document, the individual elements being frames of said document.

13. The audiovisual receiver according to claim 12, wherein the at least one processor is further configured to store a sound sequence associated with the most centrally positioned individual element in each of the plurality of memories such that the identifier of the segment further comprises the sound sequence.

14. The audiovisual receiver according to claim 8, wherein the at least one processor is further configured to play back the identifier associated with the segment.

* * * * *